Figure 10:
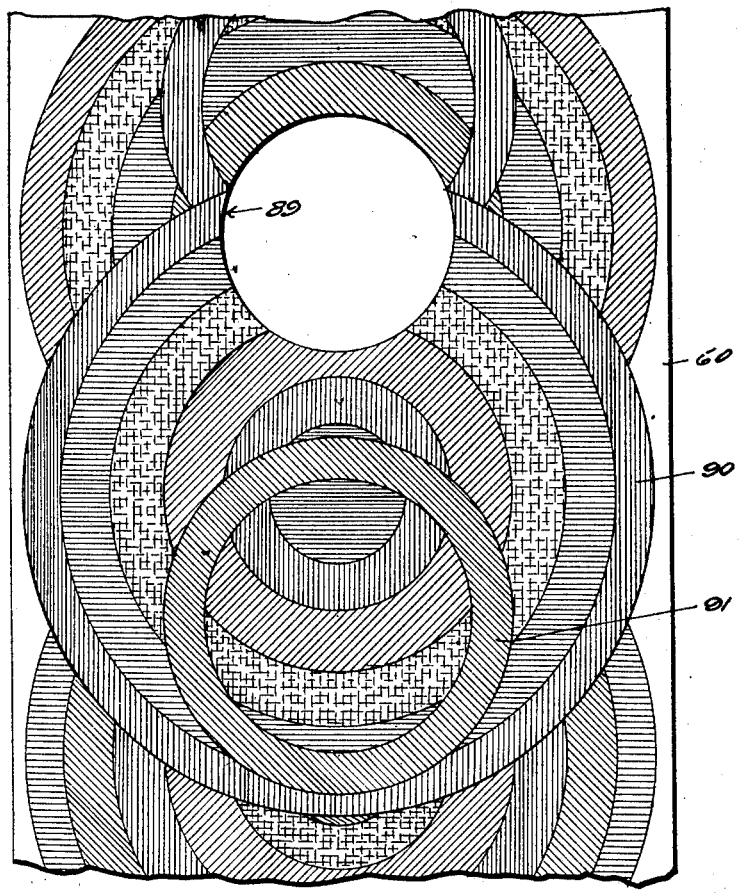

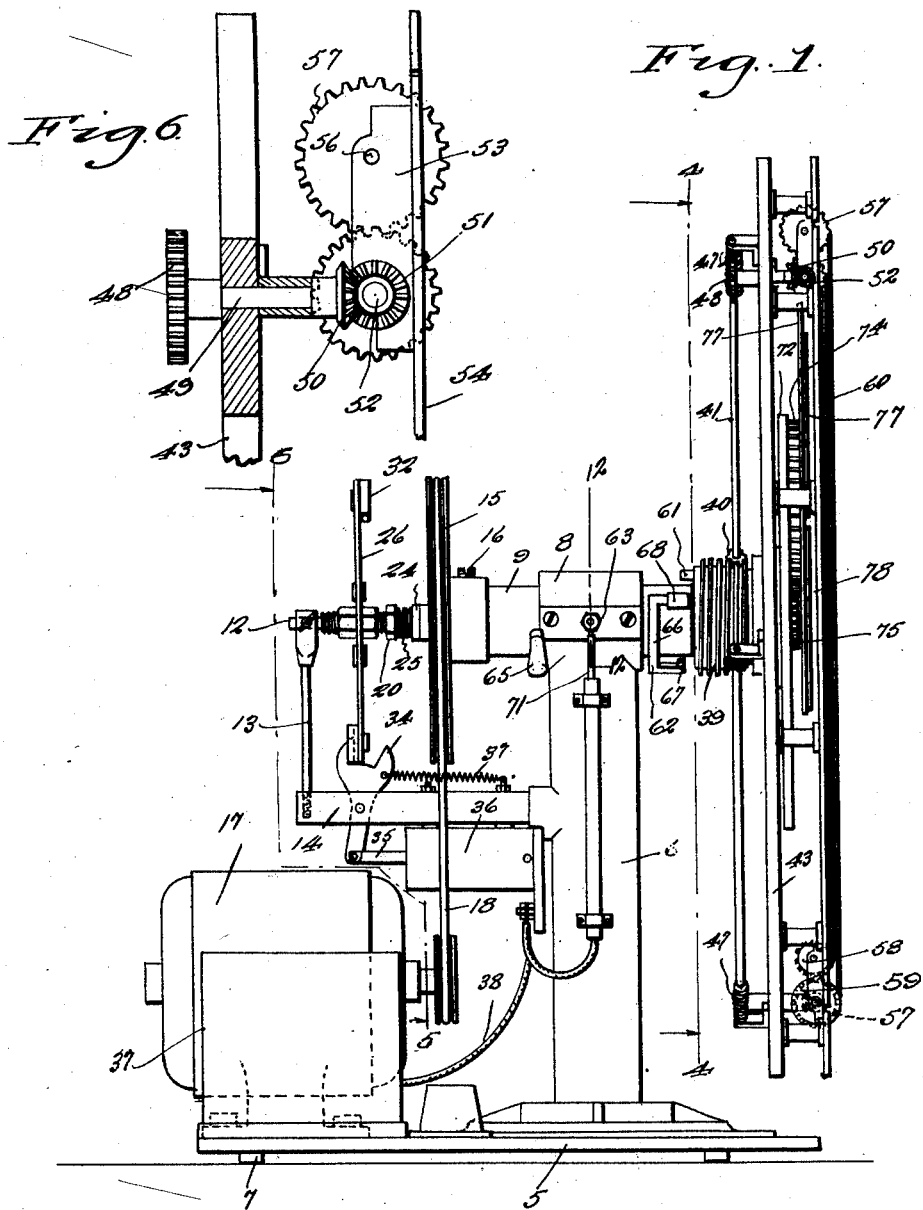

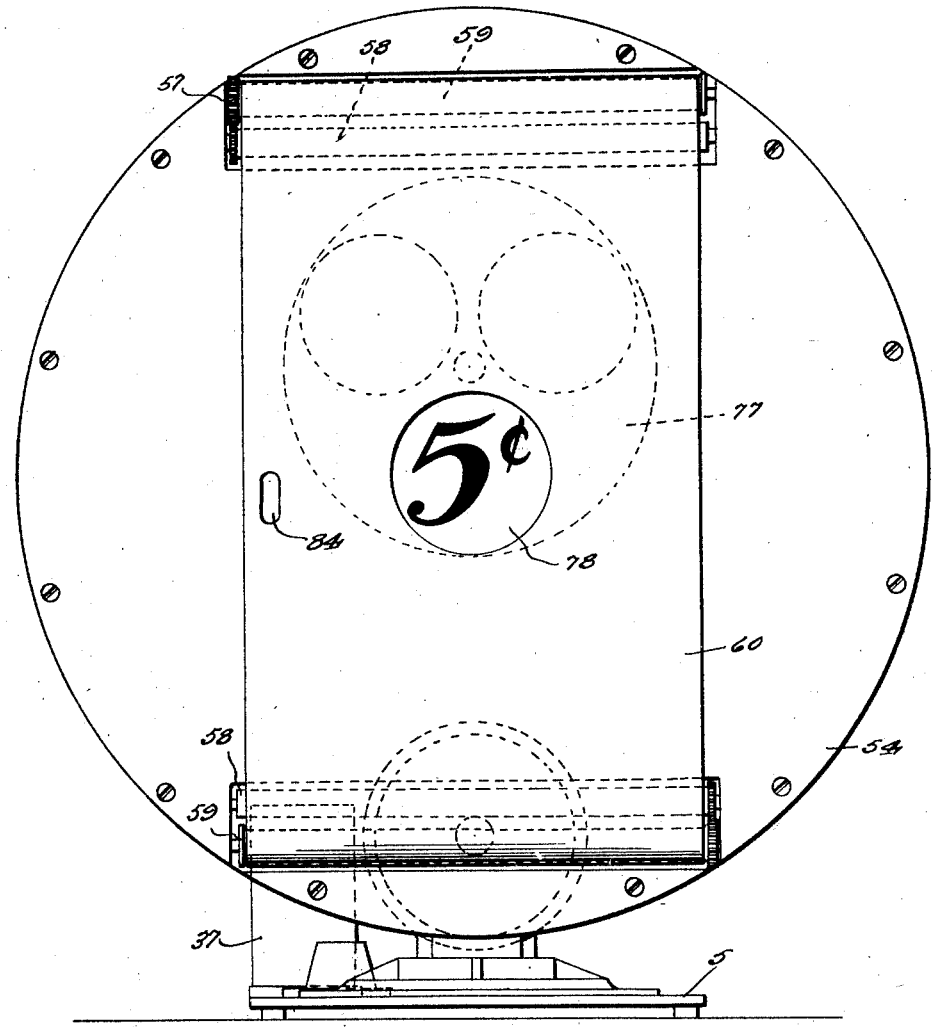

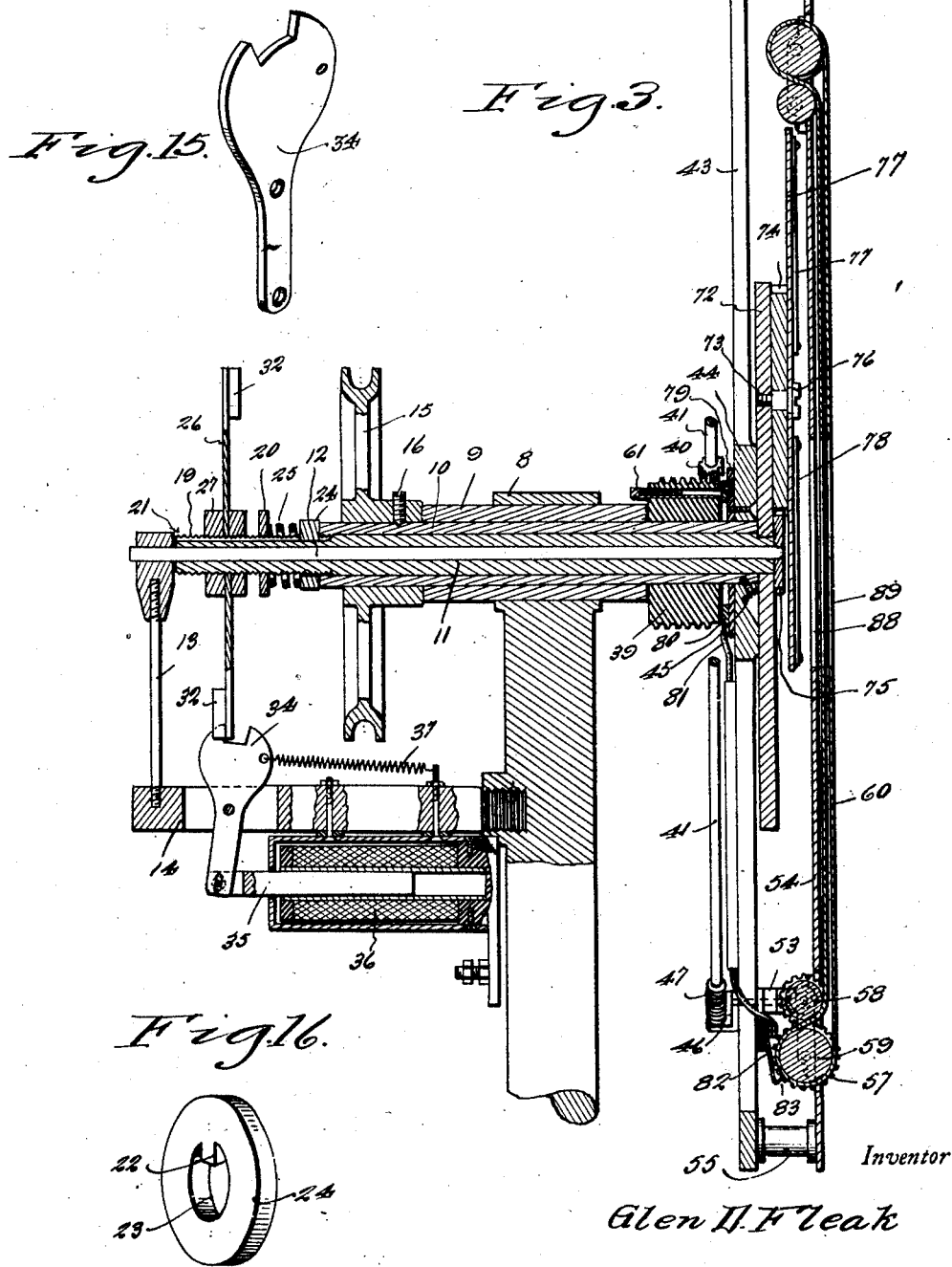

March 26, 1929.  G. D. FLEAK  1,707,081
ADVERTISING DEVICE
Filed Jan. 4, 1929  8 Sheets-Sheet 4
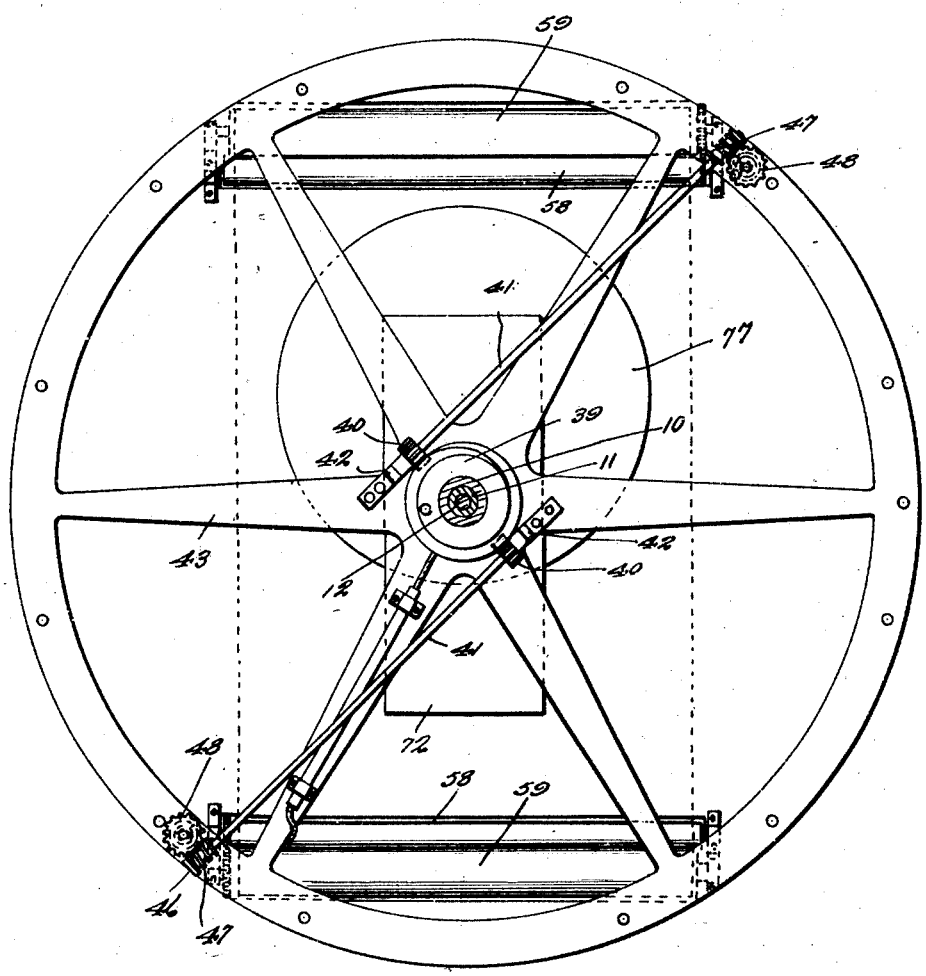
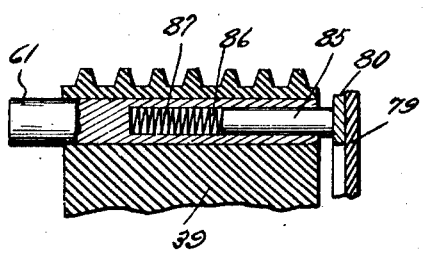
Inventor
Glen D. Fleak
By Clarence A. O'Brien
Attorney March 26, 1929. G. D. FLEAK 1,707,081
ADVERTISING DEVICE
Filed Jan. 4, 1929   8 Sheets-Sheet 5
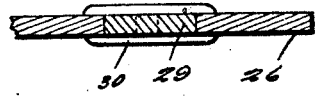
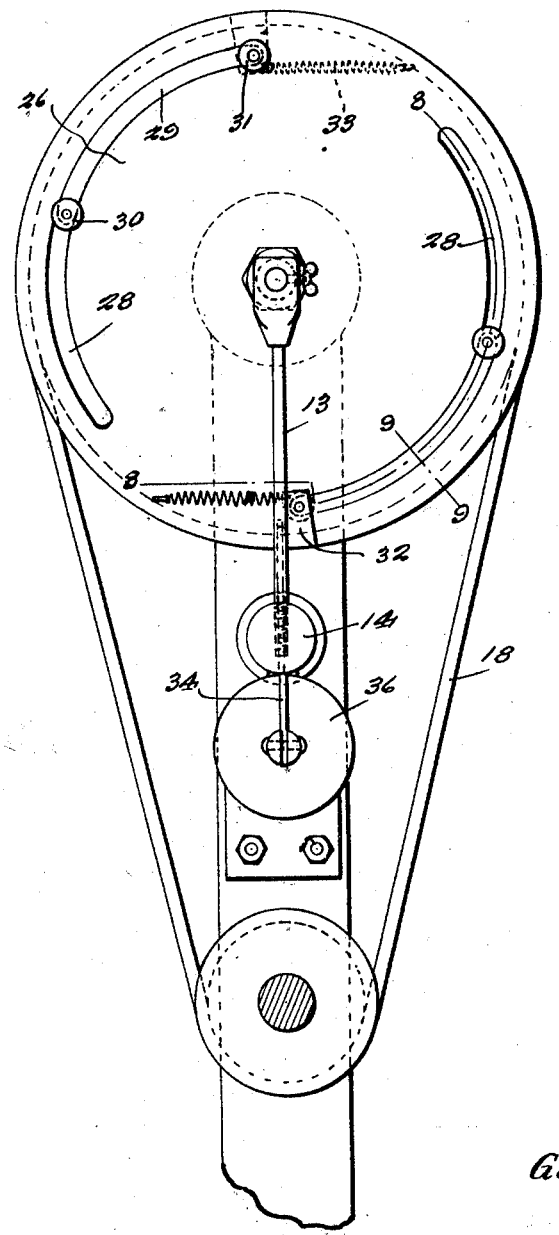
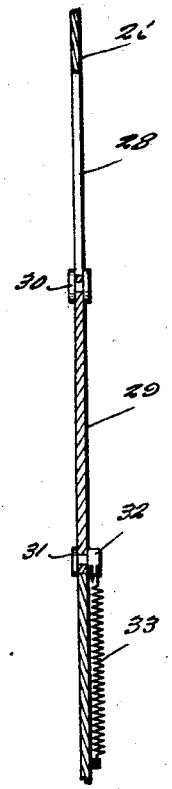
Inventor
Glen D. Fleak
By Clarence A. O'Brien
Attorney March 26, 1929.  G. D. FLEAK  1,707,081
ADVERTISING DEVICE
Filed Jan. 4, 1929   8 Sheets-Sheet 6

Inventor
Glen D. Fleak

By Clarence A. O'Brien
Attorney

March 26, 1929.   G. D. FLEAK   1,707,081
ADVERTISING DEVICE
Filed Jan. 4, 1929   8 Sheets-Sheet 7
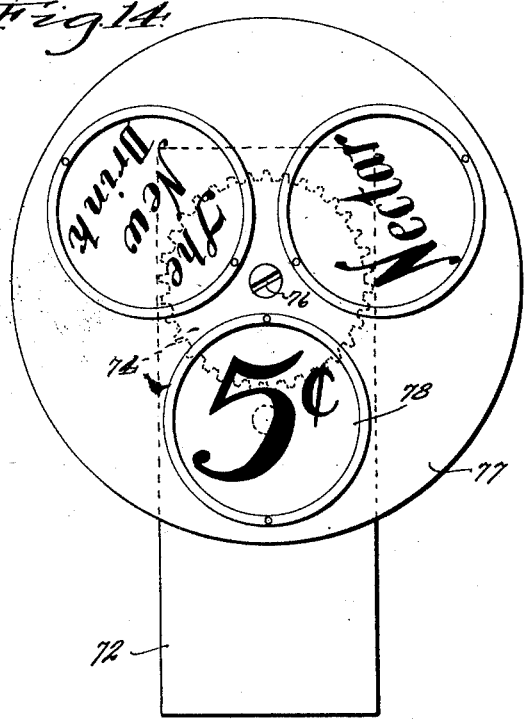
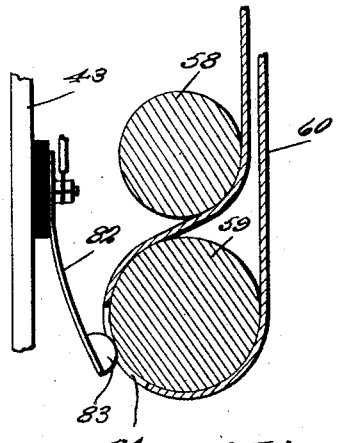
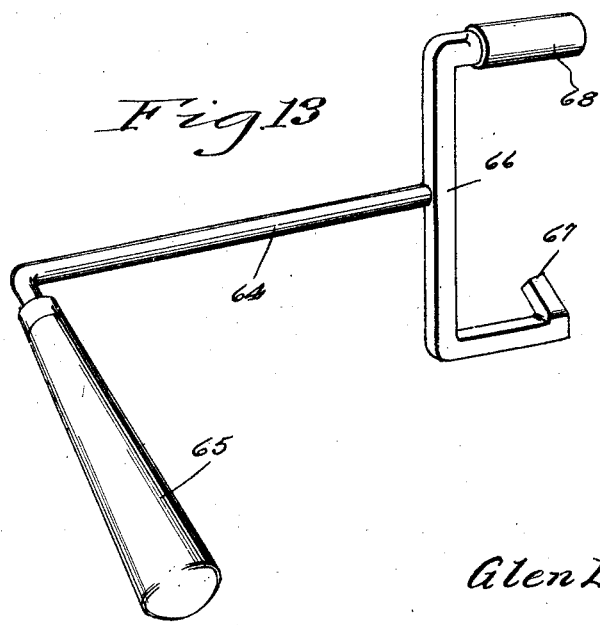
Inventor
Glen D. Fleak
By Clarence A. O'Brien
Attorney

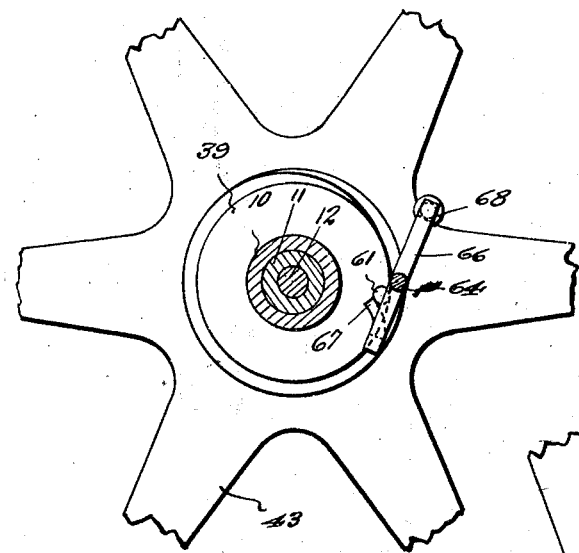
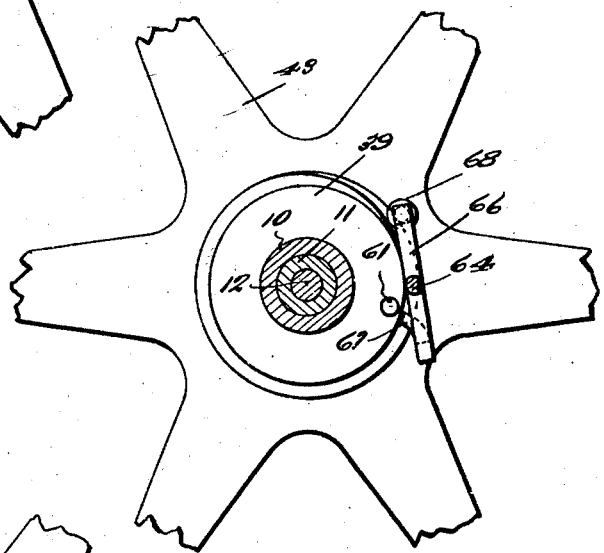
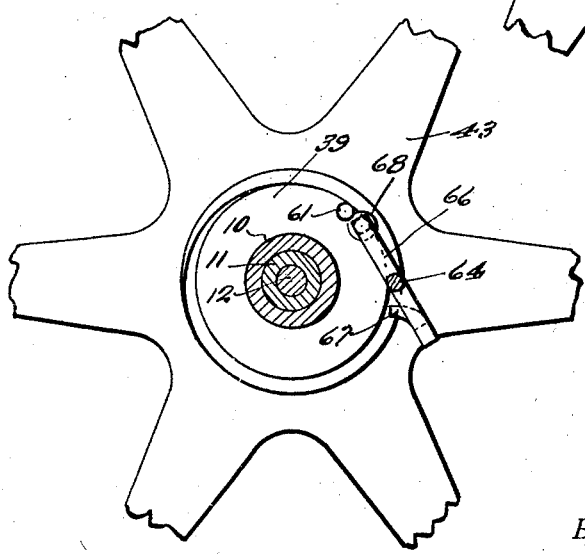

Patented Mar. 26, 1929.

1,707,081

UNITED STATES PATENT OFFICE.

GLEN D. FLEAK, OF BEAUMONT, TEXAS.

ADVERTISING DEVICE.

Application filed January 4, 1929. Serial No. 330,180.

The present invention relates to advertising devices and more particularly to changeable exhibitors in which a series of advertising elements are successively brought into display position.

An important object of the invention is to provide an advertising device of this character providing an endless curtain having display openings formed therein at predetermined intervals through which the advertisements appear; also to provide means for operating the curtain across the advertising display element and arranging the outer surface of the curtain with a novel combination of colors operable to produce a pleasing and attractive display upon the curtain in combination with the advertisement.

A still further object of the invention is to provide an advertising device of this character embodying a rotating element mounted on a horizontal shaft with an endless curtain mounted for movement across the face of said element and in advance of a rotatable mounting for a series of separate advertisements, with common operating means for each of said elements, arranging an automatic control means for the mounting for the advertisement whereby to successively move the same into display position and providing manual control means for moving either the mounting for the advertisement or the curtain out of operative engagement.

Another object of the invention is to provide electro-magnetic control means for the mounting for the advertisement and arranging the same for actuation at predetermined intervals through the movement of said curtain.

A still further object of the invention is to provide an eelctrically operated changeable exhibitor of this character possessing highly novel and attractive features embodying an everchanging color display with colors of predetermined combination, which is adapted for operatively mounting in any desired position within a show window or the like, which may be constructed in a substantially compact manner, inexpensive to maintain in operation and otherwise well adapted for the purposes for which the same is intended.

Figure 12:
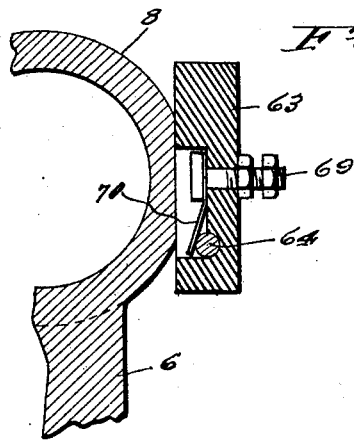

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view of the apparatus in assembled position,

Figure 2 is a front elevational view thereof showing the endless curtain before painting or otherwise arranging the color scheme thereon, Figure 3 is a vertical longitudinal sectional view through the drive shaft and parts of the apparatus mounted thereon, Figure 4 is a transverse sectional view taken substantially along a line 4—4 of Figure 1, and looking in the direction of the arrows, Figure 5 is an elevational view of the inner end of the apparatus and taken partly in vertical section, substantially along a line 5—5 of Figure 1, Figure 6 is a fragmentary sectional view through a portion of the rotating wheel and illustrating the drive connection for the curtain roller, Figure 7 is a fragmentary sectional view through a portion of the worm mounted on the shaft and illustrating the brush mounting forming the electrical connection therethrough, Figure 8 is a fragmentary sectional view through the control disk for the changeable exhibitor, taken substantially along a line 8—8 of Figure 5, Figure 9 is a similar view taken substantially along the line 9—9 of Figure 5, Figure 10 is a fragmentary view in elevation of the display face of the endless curtain illustrating the color scheme provided thereon, Figure 11 is a detail, with parts shown in section, of the circuit closer operable through the curtain, Figure 12 is a fragmentary sectional view through the mounting for the manual control means, taken substantially along a line 12—12 of Figure 1, Figure 13 is a perspective view of the manual control lever, Figure 14 is a view in elevation of the mounting for the series of advertisement, Figure 15 is a perspective view of the electro-magnetically operated lever controlling the actuation of the changeable exhibitor control disk, Figure 16 is a similar view of the friction washer forming the drive connection for the inner and outer tubular shaft, and Figures 17, 18 and 19, are fragmentary transverse sectional views through the shaft illustrating the various positions of the manual control lever.

Referring now to the drawing in detail, wherein for the purpose of illustration I have disclosed a preferred embodiment of the invention, the numeral 5 designates a base plate having a standard 6 extending upwardly therefrom, the base 5 is preferably mounted on rubber sheet 7 to prevent injury to the surface upon which the apparatus is placed.

The upper end of the support 6 is formed into a bearing 8 within which is fitted a bearing sleeve 9 disposed horizontally, said bearing sleeve providing a mounting for rotatably supporting an outer tubular shaft 10 and an inner tubular shaft 11, said inner tubular shaft having a stationary shaft 12 extending therethrough.

Each of the shafts 10, 11 and 12, extend outwardly from each end of the bearing sleeve 9 as clearly illustrated in Figure 3 of the drawing. The rear end of the stationary shaft 12 is supported by standards 13 extending upwardly from the bracket 14 protruding rearwardly from the standard 6.

A pulley wheel 15 is mounted on the outer tubular shaft 10 and fixedly secured for rotation therewith by a set screw 16. A motor 17 is mounted upon the base 5 for driving a belt 18 operatively connected with the pulley wheel 15.

Both the outer tubular shaft 10 and inner tubular shaft 11 are mounted for independent rotation upon the stationary shaft 12 and the rear end of the inner tubular shaft 11 is externally threaded as shown at 19 with a nut 20 adjustably threaded thereon. A keyway 21 is formed longitudinally in the threaded end of the tubular shaft 11 within which a key 22 extending inwardly of an opening 23 formed in a friction washer 24 is adapted to slidably fit.

The washer 24 is thus mounted for rotation on the inner shaft 11 with one face thereof disposed in engagement with the rear end of the outer tubular shaft 10. A compression spring 25 is mounted on the shaft 11 and interposed between the nut 20 and washer 24 whereby yieldably maintaining the washer in friction engagement with the end of the shaft 10.

The tubular shafts 10 and 11 are thus connected for rotation as a unit. A control disk 26 is also mounted on the rear end of the inner tubular shaft 11 and secured for rotation therewith and in longitudinally adjusting position by lock nuts 27 threaded on the end of said shaft. The disk 26 is formed with a pair of arcuate slotted openings 28 formed concentrically in the disk at diametrically opposite sides thereof and within each of which grooves is slidably mounted an arcuate member 29 having one end provided with a pair of guide rollers 30, disposed at the opposite faces of the disk and having the opposite end of each of said members 29 provided with a guide roller 31 disposed at one side of the disk and a stop member 32 disposed at the opposite side thereof.

The stop members 32 for the respective arcuate members 29 of the disk are disposed at opposite sides of the disk as clearly illustrated in Figures 3 and 5 of the drawing. Expansion springs 33 attached at one end to the disk 26 are connected to each of the stop members 32 for yieldably retaining the same in position at the end of the groove 28 adjacent their associated stop members 32.

The periphery of the disk 26 is mounted for rotation in the bifurcated end of a lever 34 pivotally mounted on the bracket 14. The opposite end of the lever 34 is attached to one end of an armature 35 oppositely associated with an electro-magnet 36 also supported by the bracket 14.

An expansion spring 37 is connected at one side of the lever 34 for yieldably retaining in one position with respect to the stop member 32 and with the armature 35 extended outwardly from the electro-magnet 36. The base 5 also provides a mounting for a transformer 37 of a character suitable for supplying low voltage current to the electric magnet 36 through the circuit wires 38 connected therewith.

A worm 39 is freely mounted on the outer tubular shaft 10, adjacent the forward end thereof and with which is operatively engaged a pair of pinion gears 40, disposed at diametrically opposite sides of the worm 39 and carried on parallel shafts 41 disposed tangentially with respect to the axis of the shaft and supported at one end in brackets 42 secured to a spoke wheel 43.

The hub 44 of the wheel is mounted on the outer tubular shaft 10 and suitably secured thereto by screws 45 as illustrated in Figure 3 of the drawings for rotation with said shaft.

The outer ends of the shafts 41 are journaled in brackets 46 secured adjacent the perimeter of the wheel 43 and provided at each outer end with worms 47. The worms 47 are operatively engaged with pinion gears 48 mounted on shafts 49 journaled in the rim of the wheel and on which shaft is also keyed a bevel gear 50 operatively engaged with a similar gear 51 mounted at one end of a roller shaft 52.

The roller shafts 52, operatively associated with the respective shaft 41 of the wheel 43, are journaled for rotation in brackets 53 secured at diametrically opposite sides of a disk 54 secured in spaced parallel relation with respect to the wheel by spacing members 55 as clearly illustrated in Figure 3 of the drawing.

As will be observed from an inspection of Figure 4 of the drawing, the roller shafts 52 are disposed at right angles with respect to the axis of the wheel 43. A second roller shaft 56 is also journaled in each pair of the brackets 53, each of the roller shafts 52 and 56 being provided with interengaging spur gears 57 for the operation thereof as a unit.

Rollers 58 and 59 are mounted respectively on the roller shafts 52 and 56 with their surfaces disposed in closely spaced relation and about which an endless curtain 60 is operatively mounted. The curtain 60 is spread about the pair of rollers 58 and 59 at the opposite sides of the disk 54 so that the inner or disposed surfaces of the curtain will be disposed in closely spaced relation as clearly illustrated in Figure 1 of the drawings.

It will be apparent from the foregoing that the operation of the curtain 60 through the gear frame above the side, is independent of the rotary movement of the wheel, by reason of the manner in which the worm 39 is freely mounted at the forward end of the outer tubular shaft 10.

The worm 39 is constructed of insulation material and is provided with a pin 61 or other conductor, material protruding outwardly from its rear edge and disposed parallel with the shaft on which the worm is mounted.

A manual control lever indicated generally at 62 in Figure 1 of the drawings is pivotally mounted in a bracket 63 secured at the upper end of the standard 6 in operative association with the pin 61.

This control lever, as illustrated in detail in Figure 13 of the drawing is composed of a shaft 64 journaled in the bracket 63 with an operating handle 65 extending at right angles from one end of the shaft and with its opposite end formed into a U-shaped member 66 with one end of said member bent inwardly at an inclined angle as shown at 67 and its opposite end provided with an insulated tip 68.

The handle 65 is also constructed of insulation material. Both of the ends 67 and 68 may be disposed within the path of movement of the pin 61 so that upon the proper manipulation of the handle 65 neither of said ends may be disposed in engaged position with said pin.

By moving the lever so that either of the ends 67 or 68 of the U-shaped member are in engagement with the pin, the worm 39 will be prevented from rotation about the shaft during the rotation of the wheel, and accordingly, and by reason of such rotary movement of the wheel the endless curtain 60 will be moved across the face of the disk 54 through the operative connection between the gears carried by the rotating wheel and the gears connected with the stationary worm. A binding post 69 is carried by the bracket 63 with a spring contact finger 70 attached to the inner end of the binding post and disposed in wiping engagement with the shaft 64 of the manual control lever.

A circuit wire 71 extends from the binding post 69 for connection with the terminals of the electro-magnet 36. A crank arm 72 is keyed on the forward end of the inner tubular shaft 11, said crank arm being disposed between the wheel 43 and the disk 54.

Extending outwardly from the forward face of the crank arm 72 is a screw 73 having a portion of its shank smooth and forming a stub shaft for a spur gear 74 disposed in engagement with a similar gear 75 of a substantially reduced diameter and fixedly secured to the stationary shaft 12.

The head 76 of the screw 73 serves to secure a disk member 77 upon the crank arm 72 and forwardly of the gear 74. A plurality of advertising plates 78 are secured to the forward face of the disk 77 and insulation plate 79 is secured to the rear face of the wheel 43 and disposed about the shaft members and to the rear face of said plate is secured a conductor ring 80 having a circuit wire 81 attached thereto and extending radially of the wheel 43 toward the outer edge thereof. The outer end of the circuit wire 81 is attached to a switch arm 82 having a contact finger 83 formed at its free end and disposed in wiping engagement and in spring pressed relation upon the surface of the endless curtain 60.

The curtain is formed of insulation material which normally prevents contact between the contact member 83 of the switch with the surface of one of the curtain rollers, which is formed of conductor material.

A slotted opening 84 is formed in the curtain, at a predetermined position adjacent one edge thereof and disposed in the path of the contact finger 83 during the movement of the curtain of the rollers. As the opening 84 of the curtain moves into position for permitting the contact finger 83 to engage the surface of the roller a circuit connection is provided through the apparatus with the motor.

The circuit is completed with the electro-magnet by means of a carbon brush 85 slidably mounted in a recess 86 formed in the forward end of the pin 61. A spring 87 is seated in the recess inwardly of the carbon brush and normally urging the same outwardly in a forward direction for engagement of the forward end of the brush with the conductor ring 80.

Accordingly the circuits are energizing the electro-magnets 36 is completed when the contact 83 is engaged with the roller 59 through the opening 84 of the curtain and by means of the circuit connection through the carbon brush 85 carried by the pin 61 and with which the conductor end 67 of the manual control lever 62 is disposed for engagement.

Accordingly upon the actuation of the electro-magnet the lever 34 engaging the top thereof will be actuated for releasing the disk 26 and permitting the partial rotation thereof.

This rotary movement of the disk will be transmitted to the crank arm 72 through the inner tubular shaft 11 causing a partial rotation of the crank arm, which in turn results in a partial rotation of the disk 77.

The disk 54 is provided with a central opening 88, of a diameter substantially equal, or slightly larger than the diameter of the advertising plate 78 and with which opening one of the advertising plates is disposed in registering position, at all times.

A pair of openings 89 are also formed in the curtain 60 of a diameter substantially equal to the opening 88 and formed in a predetermined position in the curtain so that during each complete movement of the curtain about its rollers the openings 89 will come into register with each other and also with the opening 88.

The outer surface of the curtain 60 is painted, printed or otherwise provided with a color display, as clearly illustrated in Figure 10 of the drawing, said color display preferably being arranged in the form of a series of concentric rings 90, each of said rings being colored differently from its adjacent ring.

The edges of each set of concentric rings may be disposed in overlapping relation with respect to the edges of adjacent set of concentric rings and if desired individual rings 91 may be eccentrically formed upon the surface of the sets of concentric rings.

The rings 90 and 91 may be of various widths, it being essential however, that the axis of each of the rings, both the concentric rings 90 and the eccentric rings 91 are disposed in longitudinal alinement with respect to the axis of the opening 89 formed in the curtain 60.

In the operation of the device it will be apparent that the wheel 43 will rotate continuously through its drive connection with the motor through the outer tubular shaft 10.

Accordingly the disk 54 and curtain carried thereby will likewise be rotated with the wheel about the axis of the shaft. Through the engagement of the worm 39 with either end of the manual control lever 62, the worm will be held stationary and through the operative connection of the curtain rollers with the worm the curtain will be moved across the base of the disk 54 during the rotary movement of the wheel.

As a pair of openings 89 approach the center of the disk for movement into registry with each other and with the opening 88 of the disk, the advertising plate 78 disposed immediately rearwardly of the opening 88 will be exposed to view, the movement of the pair of openings in the curtain, into and out of registering position creating the appearance of an increase and decrease in the diameter of said opening during the time the advertising plate is exposed to view.

The movement of the curtain across the face of the disk, during the rotary movement of the wheel also brings the various steps of concentric and eccentric color rings into position at the center of the disk and by providing the rings of the various concentric sets of different color combinations a constantly changing color display is thus provided.

Furthermore by arranging the center of the ring so as to move across the center of the disk, the same will create an appearance of a gradual increase and decrease of the diameter of the respective rings as the same move across the curtain.

Through the proper manipulation of the lever 62 into either of the positions as illustrated in Figures 17 to 19 inclusive, the operation of the curtain may be controlled so that the various color effects and changes may be studied and rearranged with respect to their movement across the curtain as well as with respect to their association with the advertising plate.

Upon each complete rotation of the curtain the opening 84 formed therein in passing the contact finger 83 of the switch 82 will permit engagement of the contact with the roller 59 of the curtain whereby to complete the electric circuit through the carbon brush 85 with the electro-magnet 36 for actuating the lever 34.

The actuation of this lever permits the partial rotation of the disk 26 and partially rotates the crank 72 for moving the next succeeding advertising plate 78 into registering position with the opening 88 of the disk 54.

After the opening in the curtain passes beyond the contact finger 83, the circuit is broken and the electro-magnet 36 returned to its normal position by the spring 37. The slidably mounted stop 32 mounted on the disk 26 for limiting the rotation of the disk operates to bring the disk to a gradual stop without injury to the parts.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. An advertising apparatus comprising a rotatable member having a central opening, a curtain movable relative to said member and also having an opening adapted to register with said first named opening and a movable advertising element registerable in said opening upon a predetermined movement of the curtain.

2. An advertising apparatus comprising a rotatable member having a central opening, a curtain movable diametrically across said member and also having an opening adapted to register with said first named opening and a movable advertising element registerable with said opening upon a predetermined movement of the curtain.

3. An advertising apparatus comprising a rotatable member having a central opening, a curtain movable relative to said member and also having an opening adapted to register with said first named opening, a movable advertising element registerable with said opening upon a predetermined movement of the curtain, drive means for the rotatable member, independent drive means for the curtain and intermittently operable drive means for the advertising element.

4. An advertising apparatus comprising a rotatable member having a central opening, a curtain movable relative to said member and also having an opening adapted to register with said first named opening, a movable advertising element registrable with said opening upon a predetermined movement of the curtain, drive means for the rotatable member, independent drive means for the curtain and intermittently operable drive means for the advertising element, said curtain drive means being operable through the rotation of said rotatable member.

5. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft and control means for periodically actuating said element.

6. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft, and means for controlling the operation of said elements for periodic actuation upon a predetermined movement of the curtain.

7. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft, and electro-responsive control means for the advertising elements arranged for periodically actuating the same upon a predetermined movement of the curtain.

8. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft, electro-responsive control means for the advertising element arranged for periodically actuating the same upon a predetermined movement of the curtain and manual control means for the curtain operating means.

9. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft, electro-responsive control means for the advertising element arranged for periodically actuating the same upon a predetermined movement of the curtain and manual control means for the curtain operating means, said manual control means including a circuit breaker for said electro-responsive control means whereby to provide means for selectively controlling the operation of said curtain or said advertising element.

10. An advertising apparatus comprising a rotating shaft, a member carried thereby for rotation therewith and having a central opening, an endless curtain mounted on said member for movement diametrically thereacross and also having a pair of openings registrable with said first named openings, a movable advertising element disposed rearwardly of the rotating member and the curtain and adapted for registering successive portions thereof with said openings, means operatively connecting the advertising element with the shaft, automatic control means for the periodic actuation thereof and independent operating means for the curtain dependent upon the rotation of said member.

11. An advertising apparatus comprising a rotating shaft, a member carried thereby for rotation therewith and having a central opening, an endless curtain mounted on said member for movement diametrically thereacross and also having a pair of openings registrable with said first named openings, a movable advertising element disposed rearwardly of the rotating member and the curtain and adapted for registering successive portions thereof with said openings, means operatively connecting the advertising element with the shaft, automatic control means for the periodic actuation thereof and independent operating means for the curtain dependent upon the rotation of said member, said curtain operating means comprising the worm freely mounted on the shaft, rollers mounted on the rotating member for the curtain, means operatively connecting the worm and the rollers and manual control means for the worm whereby to secure the same against movement during the rotation of the member.

12. An advertising apparatus comprising a rotating shaft, a member carried thereby for rotation therewith and having a central opening, an endless curtain mounted on said member for movement diametrically thereacross and also having a pair of openings registrable with said first named openings, a movable advertising element disposed rearwardly of the rotating member and the curtain and adapted for registering successive portions thereof with said openings, means operatively connecting the advertising element with the shaft, automatic control means for the periodic actuation thereof and independent operating means for the curtain dependent upon the rotation of said member, said curtain operating means comprising the worm freely mounted on the shaft, rollers mounted on the rotating member for the curtain, means operatively connecting the worm and the rollers and manual control means for the worm whereby to secure the same against movement during the rotation of the member, said automatic control means for the advertising element comprising a friction clutch operatively connecting the shaft with said element, electro-responsive control means for the clutch, a circuit breaker having circuit connection with the electro-responsive control means and means carried by the curtain for controlling said circuit breaker during a predetermined movement of the curtain.

13. An advertising apparatus comprising a rotating shaft, a member carried thereby for rotation therewith and having a central opening, an endless curtain mounted on said member for movement diametrically thereacross and also having a pair of openings registrable with said first named openings, a movable advertising element disposed rearwardly of the rotating member and the curtain and adapted for registering successive portions thereof with said openings, means operatively connecting the advertising element with the shaft, automatic control means for the periodic actuation thereof and independent operating means for the curtain dependent upon the rotation of said member, said curtain operating means comprising the worm freely mounted on the shaft, rollers mounted on the rotating member for the curtain, means operatively connecting the worm and the rollers and manual control means for the worm whereby to secure the same against movement during the rotation of the member, said automatic control means for the advertising element comprising a friction clutch operatively connecting the shaft with said element, electro-responsive control means for the clutch, a circuit breaker having circuit connection with the electro-responsive control means and means carried by the curtain for controlling said circuit breaker during a predetermined movement of the curtain, and said manual control means comprising a lever having a forked member formed at one end with either of the forked portions adapted for engaging the worm, one of said portions being insulated and the other of said portions being adapted for providing a circuit connection through said worm with said circuit breaker whereby to selectively control the actuation of the curtain and said advertising element.

14. An advertising apparatus comprising a rotating shaft, a member carried thereby for rotation therewith, and having a central opening, an endless curtain mounted on said member for movement diametrically thereacross and also having a pair of openings registrable with said first named opening, a movable advertising element disposed rearwardly of the rotating member and the curtain and adapted for registering successive portions thereof with said opening, means operatively connecting the curtain with the shaft through said rotatable member, means operatively connecting the advertising element with the shaft and control means for periodically actuating said element, said curtain having its outer surface coated with a series of vari-colored eccentric and concentric rings disposed for movement into a position concentric with the opening of said rotating member during the rotation thereof.

In testimony whereof I affix my signature.

GLEN D. FLEAK.